Sept. 23, 1969   D. J. CRAFT   3,468,342
FLUID CONTROL DEVICES
Filed Oct. 18, 1965   2 Sheets-Sheet 1

United States Patent Office 3,468,342
Patented Sept. 23, 1969

3,468,342
FLUID CONTROL DEVICES
David John Craft, Taplow, England, assignor to British Telecommunications Research Limited, Taplow, England, a British company
Filed Oct. 18, 1965, Ser. No. 497,031
Claims priority, application Great Britain, Nov. 10, 1964, 45,805/64
Int. Cl. F16l 55/14; F15d 1/02
U.S. Cl. 137—625.66                       7 Claims

ABSTRACT OF THE DISCLOSURE

The invention disclosed relates to a fluid control device suitable for use in a fluid logic system and comprises the provision of two inter-engaging flexible tubes so arranged that the distention of either tube by fluid will involve the constriction and possible complete closure of the other, thereby controlling fluid flow therein. It is shown applied to a two-state logical element, an OR gate, and a bistable device or toggle.

---

The present invention relates to fluid control devices and is more particularly concerned with devices such as may be employed in what have now come to be known as fluid logic systems. Such devices may be arranged to perform a number of different functions, for instance they may act as so-called fluid toggles or bi-stable devices or they may be used as analogue amplifiers in the sense that a device operating at low pressure may be used to control a device operating at a much higher pressure.

The main requirements for such devices are that they should be simple and inexpensive to construct, reliable in operation and compact in size so that if necessary a number of different devices may be accommodated in a comparatively small space. The chief object of the invention is to provide a control device which meets these requirements and facilitates the building-up of fluid logic circuits.

According to the present invention, a fluid control device comprises a main flexible tube and a control flexible tube, each constrained between a fixed rigid surface and a movable rigid surface, the movable surface associated with the control tube being arranged to contact such tube over a greater area than that over which the movable surface associated with the main tube contacts such tube and said movable surfaces being so located with respect to their associated fixed surfaces and so interconnected that when the control tube is fully distended, the main tube is substantially closed.

The invention will be better understood from the following description of several methods of carrying it into effect which should be taken in conjunction with the accompanying drawings in which.

Figure 1:
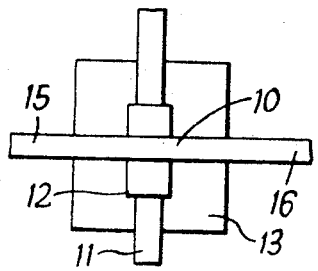
FIGURE 1 is a diagrammatic plan of a simple form of the device with the upper fixed rigid surface removed.
Figure 2:
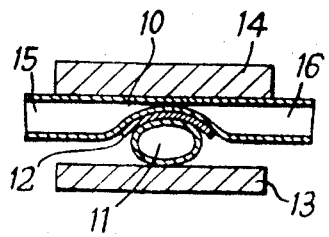
FIGURE 2 is a sectional elevation of the device shown in FIGURE 1.

In the simple form of the arrangement shown in FIGURES 1 and 2, two flexible tubes 10 and 11 are arranged in cross, preferably at right angles as shown, and the tube 11 is provided with a rigid member 12 which is curved so as to conform generally to the outside of the tube 11. The intersection of the two tubes is confined between two rigid plates 13 and 14 which are spaced apart a distance appreciably less than the sum of the diameters of the tubes so that when one tube is fully distended, the other is closed. In what may be considered as the normal condition, no fluid pressure is applied to the tube 11, with the result that fluid at a specific pressure applied to the input 15 of the tube 10 is able to give a corresponding pressure at the output 16. This is because the fluid in 10 distends the tube to substantially its full size with a corresponding flattening of the tube 11. If, however, the tube 11 is pressurized, it tends to expand to a circular shape and in consequence the rigid member 12 is raised and constrains the tube 10, thereby producing a throttling effect (as shown) or a complete cut-off. Since the control pressure in tube 11 acts over the whole area of the rigid member 12, while the pressure in tube 10 can only act over the area which contacts the rigid member 12, it is possible to obtain a pressure gain from the device. In other words, a low pressure in tube 11 can shut off completely a much higher pressure in tube 10.

Figure 3:
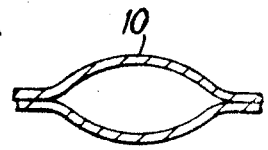
FIGURE 3 shows a preferred section of the tube which is to be controlled.

The tubes 10 and 11 need not be circular in cross-section and it is preferable that at any rate tube 10 should have a section similar to that shown in FIGURE 3 so that it may be closed completely without exceeding the elastic limit of the material. It is obviously not necessary that tube 11 should be completely closed when tube 10 is fully distended and in any event the rigid member 12 would prevent this happening.

Figure 4:
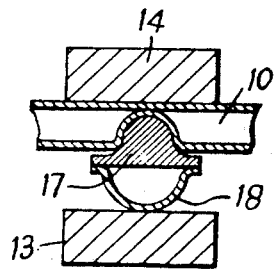
FIGURE 4 and FIGURES 5 and 6 are sectional elevations of two alternative forms of the device.

It may be convenient for the rigid member to be moulded integrally with the control tubes as shown in FIGURE 4, where the portion 17 is made of rigid material and portion 18 of flexible material. The cross section of the composite tube may be as shown in FIGURE 4 or alternatively it may be as in FIGURES 5 and 6.

Figure 5:
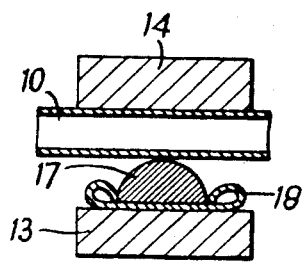
Figure 6:
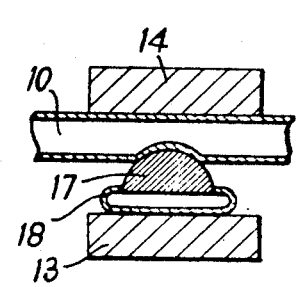

With the tube in the position shown in FIGURE 5, the area on which the control pressure can act is comparatively small. As soon as the tube starts to open, as shown in FIGURE 6, the area is increased very considerably, hence once the operation has started, it is completed in a positive and reliable manner. This construction ensures that no effect will be produced by only a slight change in the control pressure. This may be important where it is desired to secure digital rather than analogue working, that is to say the control is required to provide only one or other of two states without any intermediate condition.

Figure 7:
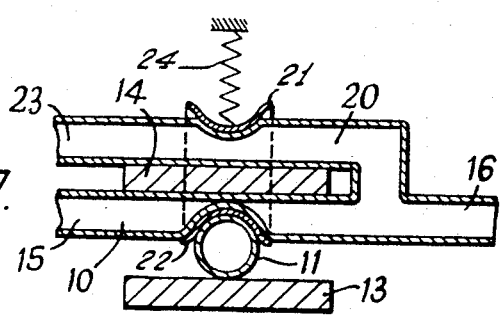
FIGURE 7 shows how the principles of the invention can be utilized to form a logical element with two outputs.

In the arrangement of FIGURE 7, which shows the invention applied to a two-output logical element, tube 10 is provided with a branch tube 20 and the control exerted by the tube 11 is by means of two rigid members 21 and 22 which are connected together to form a frame which moves as a whole. The frame is spring loaded for example by means of a compression spring 24 acting against the frame member 21, so that the branch tube 20 is closed when the tube 11 is collapsed. The tube 20 is assumed to be supplied with suitable pressure fluid at the input 23 while the input 15 of tube 10 is open to atmosphere, assuming that the fluid is compressed air.

In the condition shown, in which the tube 11 is substantially fully expanded, the tube 10 is closed and the branch tube 20 is open and consequently the output 16 is at the same pressure as the input 23. If now the pressure is reduced in the control tube 11, the frame will move downwards with the effect that the pressure source is cut off and the tube 10 is opened so that the output 16 is at atmospheric pressure.

Alternatively, reverse operation may be secured by locating the tube 11 at the top of the frame to co-operate with the rigid member 21 so that pressure therein will act directly to close the tube 20 and in this case a spring would not be required since the pressure in the tube 20 will cause the frame to return to its initial position. Further control functions are possible if tubes are provided both above and below the frame, in which case the output may be sealed if desired.

Figure 8:
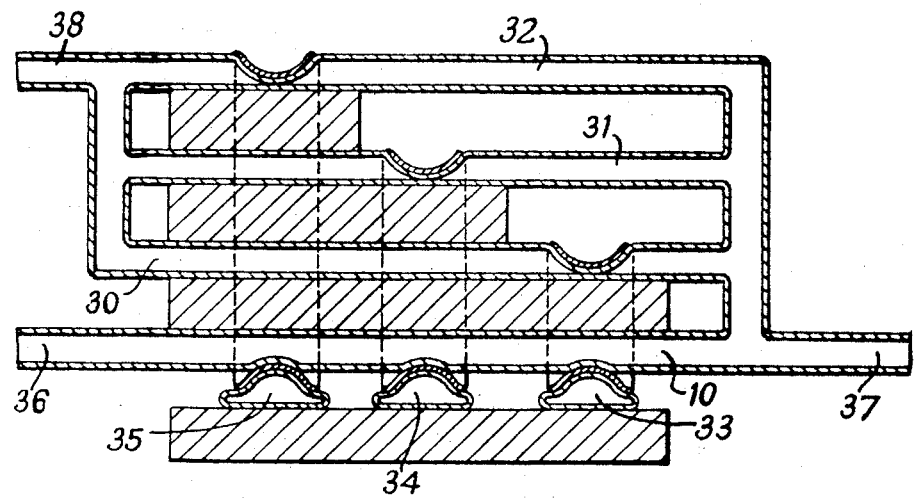
FIGURE 8 is a schematic sectional view showing how a number of devices may be combined to form an OR gate.

FIGURE 8 shows a somewhat more complicated device which may be arranged to operate as an OR gate. As illustrated the main tube 10 is provided with three branch tubes 30, 31 and 32 which are controlled respectively by tubes 33, 34 and 35 which are assumed to act on the respective frames shown.

In this case, if all the control tubes are collapsed, a pressure applied at the input 36 extends to the output 37. If however any one of the control tubes is supplied with control pressure, the pressure applied at the input 36 will be cut off and the output will be connected to the input 38 which may, for example, be open to atmosphere. This effect will not be changed if two or more of the control tubes are effective simultaneously.

Figure 9:
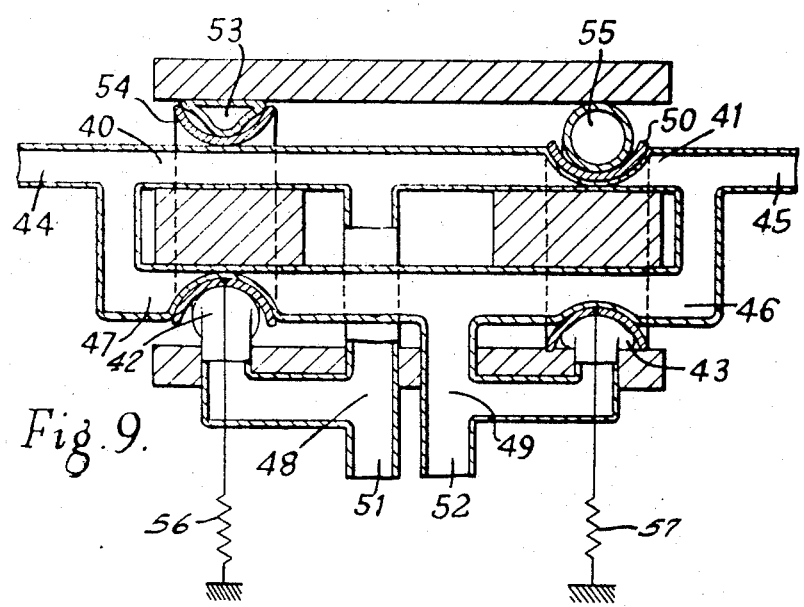
FIGURE 9 is a schematic sectional view showing the invention applied to provide a bi-stable device or toggle.

FIGURE 9 shows how two units similar to those shown in FIGURE 7 may be combined to form a bi-stable device or toggle, that is, a device which can be operated to either state by a momentary control pulse and will then remain in that state until changed over by the opposite control. The two elements have control tubes both above and below the frame, as shown in FIGURE 9 and the two frames are subject to the action of the tension springs 56 and 57 in such a manner as to tend to move downwards and thus close tubes 40 and 41 respectively. The tubes 42 and 43 extend at right angles to the paper for at least the length of the rigid members and are closed at the remote end. They are of course constrained transversely as in the various other arrangements to enable them to act effectively on the frames. Fluid pressure is applied to the input 44 and the port 45 is open to atmosphere.

The method of operation is as follows. Suppose that initially tubes 40 and 46 are open and tubes 41 and 47 are closed as shown. Tube 42 will then be connected to the pressure at the input 44 via tube 48, and will keep tube 47 closed and tube 40 open. Since tube 49 is connected to tube 46 which is open, tube 43 will be connected to the atmosphere, and the action of the spring 57 on bridge frame 50 will keep tube 41 closed and tube 46 open. Output 51 is then at the pressure applied at the input 44 and output 52 open to atmosphere. If pressure is now applied to control tube 53, the effect of tube 42 on bridge frame 54 is neutralised, and it moves under the action of its spring 56 to close tube 40 and open tube 47. This disconnects the pressure supply from tube 42 and output 51 and connects it to the port 45, via tubes 47 and 46. Consequently a pressure gradient is set up in these tubes and the resulting pressure in tube 43 is sufficient to cause frame 50 to close tube 46 and open tube 41. The pressure in tube 43 and at output 52 then rises to the pressure applied at the input 44 and that in 42 and output 51 falls to atmospheric pressure. The device is then in its second state which is stable independently of the condition of the tube 53. It can be returned to its original state in a generally similar manner by applying pressure to tube 55. When this is done, the frame 50, which is then in its uppermost position, is moved downwards under the action of spring 57 since tube 55 neutralises the effect of tube 43. Bridge frame 54 is arranged so that it does not completely close tube 40 in the lowermost position but exercises a severe throttling effect. As tube 41 is open to atmosphere at this time, the pressure at outlet 51 is not noticeably different from atmospheric and tube 42 cannot become effective. When tube 41 is closed however by the downward movement of frame 50, pressure builds up in tube 40 between the frames and rises sufficiently to cause tube 42 to start the movement of frame 54. As a consequence the partial opening of the tube 40 increases the pressure applied to tube 42 and the frame moves to its upper end position. The initial movement is assisted by the fact that there is pressure in tube 40 on the left of the frame 54 and atmosphere on the right and this tends to move the frame upwards against the tension of spring 56. The position is now as in FIGURE 9 which means that tube 47 is cut off and also owing to the movement of the frame 50, tube 41 is now closed. The situation is accordingly fully restored to that shown and pressure is now applied to outlet 51 while outlet 52 is connected to atmosphere.

The construction according to the invention therefore provides the fluid logic designer with an additional useful tool and thus facilitates the more general adoption of this advantageous control technique.

We claim:

1. A fluid control device comprising a first main flexible tube, a second main flexible tube spaced a predetermined distance therefrom, a first source of fluid at a predetermined pressure connected to one end of said first main tube, a second source of fluid at a different predetermined pressure connected to one end of said second main tube, the opposite ends of said first and second main tubes being connected together to provide a common output, a frame movable between two end positions and spanning said first and second main tubes, said frame being so dimensioned as to constrict one or other of said tubes depending on which end position it occupies, and a control flexible tube arranged when distended to move said frame from one end position to the other, whereby the movement of said frame due to the distention of said control tube causes said first main tube to be substantially closed and said second main tube to be opened so that the pressure at said output changes from one of said one predetermined values to the other of said predetermined values.

2. A device as claimed in claim 1 in which a spring is provided to cause said frame to occupy one of said end positions when said control tube is not distended.

3. A device as claimed in claim 1 in which fluid at the higher of said two predetermined pressures is supplied to the one of said first and second tubes which is substantially closed when said frame occupies the one of said end positions in which said control tube is distended so that said frame is caused to occupy the other of said end positions when said control tube is not distended.

4. A device as claimed in claim 1 in which said first and second main tubes and said control tube are positioned so as to cross one another with one member of said frame between said control tube and one of said main tubes, the said member being curved so as to conform generally to the outer surface of said control tube and being arranged to contact said control tube over an appreciably greater area than that over which it contacts said one main tube.

5. A device as claimed in claim 4, in which the said member of the frame is formed integrally with said control tube.

6. A fluid control device comprising a main flexible tube, a source of fluid at a predetermined pressure connected to one end of said main tube, an output connected to the other end of said main tube, a plurality of auxiliary flexible tubes spaced at predetermined distances from said main tube, said auxiliary tubes being respectively connected together at one end and to a source of fluid at a different predetermined pressure and respectively connected together at the other end and to said output, a like plurality of frames each movable between two end positions and spanning respectively one of said auxiliary tubes and said main tube, each frame being so dimensioned as to constrict either said main tube or the respective associated auxiliary tube depending on which end position it occupies, and a like plurality of control flexible tubes respectively associated with said frames and arranged when distended to move their respective frames from one end position to the other, whereby the movement of any one or more of said frames due to the distention of the associated control tubes causes said main tube to be substantially closed and the one or more respective auxiliary tubes to be opened so that the pressure at said output changes from one of said predetermined values to the other.

7. A fluid control device for providing one or other of two predetermined pressures alternatively at one or other of two outputs, comprising a first source of fluid at a predetermined pressure, a second source of fluid at a different predetermined pressure, first and second flexible tubes spaced a predetermined distance apart and extending from said first source to said second source, a first frame movable between two end positions, a second frame movable between two end positions, each of said frames spanning said first and second tubes and being so dimensioned that said first tube is substantially closed when the frame is in one of said end positions and said second tube is substantially closed when said frame is in the other of said end positions, a connection from said first tube extending to one of said outputs and located between the places where it is contacted respectively by said first and second frames, a connection from said second tube extending to the other of said outputs and located between the places where it is contacted respectively by said first and second frames, a first auxiliary flexible tube connected to one of said outputs and arranged when distended by fluid at the higher of said two predetermined pressures to move one of said frames to one of said end positions, a second auxiliary flexible tube connected to the other of said outputs and arranged when distended by fluid at said higher pressure to move the other of said frames to the corresponding one of said end positions, a first control flexible tube arranged when distended to move said first frame to the other of said end positions, a first spring also tending to move said first frame to said other end position, a second control flexible tube arranged when distended to move said second frame to the other of said end positions, and a second spring also tending to move said second frame to said other end position, whereby the application of fluid pressure to distend whichever of said two control tubes is then constricted by its associated frame causes such frame to be operated to the opposite end position and interchanges the pressures applied to said outputs.

References Cited

UNITED STATES PATENTS

| | | | |
|---|---|---|---|
| 1,284,465 | 11/1918 | Ryan | 251—5 XR |
| 2,624,364 | 1/1953 | Detlefsen | 251—7 XR |
| 3,018,793 | 1/1962 | Aagaard | 251—5 XR |
| 3,316,935 | 5/1967 | Kaiser et al. | 137—595 |
| 3,318,329 | 5/1967 | Norwood | 137—599 |

FOREIGN PATENTS

| | | |
|---|---|---|
| 1,014,043 | 5/152 | France. |
| 208,807 | 2/1940 | Switzerland. |

WILLIAM F. O'DEA, Primary Examiner

RICHARD GERARD, Assistant Examiner

U.S. Cl. X.R.

137—596.18, 597; 251—5